(12) United States Patent
DeMonte et al.

(10) Patent No.: US 8,756,857 B2
(45) Date of Patent: Jun. 24, 2014

(54) HYDRONIC HEATING SYSTEM AND METHOD FOR PEST CONTROL

(75) Inventors: Todd R. DeMonte, Cottage Grove, WI (US); Sean M. Ebert, Fitchburg, WI (US); Michael J. Steffes, Stoughton, WI (US)

(73) Assignee: Technologies Holdings Corp., Houston, TX (US)

( * ) Notice: Subject to any disclaimer, the term of this patent is extended or adjusted under 35 U.S.C. 154(b) by 417 days.

(21) Appl. No.: 13/007,021

(22) Filed: Jan. 14, 2011

(65) Prior Publication Data

US 2012/0180381 A1 Jul. 19, 2012

(51) Int. Cl.
*A01M 1/20* (2006.01)
(52) U.S. Cl.
USPC ........................................ 43/132.1
(58) Field of Classification Search
USPC .............. 43/124, 144, 130, 132.1, 133, 138
See application file for complete search history.

(56) References Cited

U.S. PATENT DOCUMENTS

| | | | |
|---|---|---|---|
| 139,562 A | 6/1873 | Fewell | |
| 919,827 A | 4/1909 | Cochrane et al. | |
| 2,051,057 A | 8/1936 | Pettit et al. | |
| 2,059,835 A | 11/1936 | Worthing et al. | |
| 2,107,268 A | 2/1938 | Avery at al. | |
| 2,365,092 A | 12/1944 | Martin | |
| 2,454,296 A | 11/1948 | Woods | |
| 2,469,963 A | 5/1949 | Grosjean et al. | |
| 3,051,464 A | 8/1962 | Yeo et al. | |
| 3,537,803 A | 11/1970 | Ignazio | |
| 3,638,858 A | 2/1972 | Alms | |
| 3,779,230 A | 12/1973 | Mucklerath | |
| 3,844,270 A | 10/1974 | Black | |
| 3,916,870 A | 11/1975 | Beavers | |
| 4,096,376 A | 6/1978 | Macklem | |
| 4,253,312 A | 3/1981 | Smith | |
| 4,296,727 A | 10/1981 | Bryan | |
| 4,341,263 A | 7/1982 | Arbabian | |

(Continued)

FOREIGN PATENT DOCUMENTS

| | | |
|---|---|---|
| CA | 2205673 | 11/1998 |
| DE | 4025828 | 2/1992 |

(Continued)

OTHER PUBLICATIONS

Pereira et al., "Lethal effects of Heat and Use of Localized Heat Treatment for Control of Bed Bug Infestations," *J. Econ. Entomol.* 2009, 102(3), pp. 1182-1188, 2009.

(Continued)

*Primary Examiner* — Peter M Poon
*Assistant Examiner* — Kathryn L Thompson
(74) *Attorney, Agent, or Firm* — Baker Botts L.L.P.

(57) ABSTRACT

In certain embodiments, a system for killing pests in an affected area includes a burner for heating a fluid. Heat exchanger units are placed within associated regions of the affected area. Each heat exchanger unit receives the fluid from the burner and emits heated air by transferring heat from the fluid to ambient air within the affected area. Air movers are positioned to circulate the heated air emitted by the heat exchanger units and prevent stratification of the heated air. A temperature difference between the fluid received by the heat exchanger units and the ambient air within the affected area results the affected area being raised to a target temperature greater than 122 degrees Fahrenheit.

12 Claims, 3 Drawing Sheets

(56) References Cited

U.S. PATENT DOCUMENTS

| | | | |
|---|---|---|---|
| 4,422,444 A | 12/1983 | Webb, Jr. |
| 4,519,776 A | 5/1985 | De Yoreo et al. |
| 4,737,616 A | 4/1988 | Wen-Ying |
| 4,776,798 A | 10/1988 | Crawford |
| 4,794,908 A | 1/1989 | Hall |
| 4,817,329 A | 4/1989 | Forbes |
| 4,840,220 A | 6/1989 | Umezu et al. |
| 4,869,665 A | 9/1989 | Coppin |
| 4,878,226 A | 10/1989 | McQuoid et al. |
| 4,900,898 A | 2/1990 | Kling |
| 4,953,320 A | 9/1990 | Nelson |
| 4,958,456 A | 9/1990 | Chaudoin et al. |
| 4,961,283 A | 10/1990 | Forbes |
| 5,052,367 A | 10/1991 | Beavers et al. |
| 5,058,313 A | 10/1991 | Tallon |
| 5,083,918 A | 1/1992 | Potter et al. |
| 5,131,836 A | 7/1992 | Coppin |
| 5,165,883 A | 11/1992 | Van Bemmel |
| 5,191,874 A | 3/1993 | McWilliams |
| 5,203,500 A | 4/1993 | Horne, Sr. |
| 5,282,334 A | 2/1994 | Kimura et al. |
| 5,320,163 A | 6/1994 | Stoodley |
| 5,349,778 A | 9/1994 | Chu |
| 5,365,692 A | 11/1994 | Gustafson |
| 5,378,086 A | 1/1995 | Campbell et al. |
| 5,385,299 A | 1/1995 | Zawada |
| 5,460,162 A | 10/1995 | Binzer |
| 5,471,782 A | 12/1995 | Brittell |
| 5,540,273 A | 7/1996 | Polk et al. |
| 5,636,786 A | 6/1997 | Daneshvar et al. |
| 5,641,463 A | 6/1997 | Langhart |
| 5,647,342 A | 7/1997 | Jamieson et al. |
| 5,678,352 A | 10/1997 | Leitner et al. |
| 5,792,419 A | 8/1998 | Williamson et al. |
| 5,867,935 A | 2/1999 | Brown |
| 5,871,151 A | 2/1999 | Fiedrich |
| 5,915,960 A | 6/1999 | Check et al. |
| 5,950,720 A | 9/1999 | Klix |
| 5,974,726 A | 11/1999 | Creeger et al. |
| 6,014,966 A | 1/2000 | Stevenson |
| 6,116,232 A | 9/2000 | Valters et al. |
| 6,141,901 A | 11/2000 | Johnson |
| 6,141,991 A | 11/2000 | Fujimoto et al. |
| 6,155,160 A | 12/2000 | Hochbrueckner |
| 6,161,763 A | 12/2000 | Reuter |
| 6,182,453 B1 | 2/2001 | Forsberg |
| 6,296,478 B1 | 10/2001 | Gatley, Jr. |
| 6,308,702 B1 | 10/2001 | Huyghe et al. |
| 6,318,358 B1 | 11/2001 | Gatley, Jr. |
| 6,327,812 B1 | 12/2001 | Hedman |
| 6,394,795 B2 | 5/2002 | Fayerman et al. |
| 6,447,737 B1 | 9/2002 | Williamson et al. |
| 6,526,964 B1 | 3/2003 | Potter et al. |
| 6,581,324 B1 | 6/2003 | Creeger et al. |
| 6,588,140 B1 | 7/2003 | Johnson et al. |
| 6,594,944 B2 | 7/2003 | Chura |
| 6,595,200 B1 | 7/2003 | Dai |
| 6,612,067 B2 | 9/2003 | Topp |
| 6,678,994 B2 | 1/2004 | Topp |
| 6,679,079 B2 | 1/2004 | Nagai et al. |
| 6,681,760 B2 | 1/2004 | Topp |
| 6,718,685 B2 | 4/2004 | Bossler |
| 6,772,829 B2 | 8/2004 | Lebrun |
| 6,875,962 B2 | 4/2005 | Uhl et al. |
| 6,880,548 B2 | 4/2005 | Schultz et al. |
| 6,880,549 B2 | 4/2005 | Topp |
| 6,884,065 B2 | 4/2005 | Vandrak et al. |
| 6,892,491 B2 | 5/2005 | Hedman |
| 6,921,261 B2 | 7/2005 | Perry |
| 6,923,173 B2 | 8/2005 | Schonberger, Sr. |
| 7,100,540 B2 * | 9/2006 | Vaughan .......... 122/40 |
| 7,134,239 B2 | 11/2006 | Barra |
| 7,251,950 B2 | 8/2007 | Matsumoto et al. |
| 7,481,650 B2 | 1/2009 | Mosiewicz et al. |
| 7,614,180 B2 | 11/2009 | Durand |
| 7,682,560 B2 | 3/2010 | Brash |
| 7,690,148 B2 | 4/2010 | Hedman |
| 7,740,987 B2 | 6/2010 | Miyauchi et al. |
| 7,823,579 B2 | 11/2010 | Vandrak et al. |
| 7,908,791 B1 | 3/2011 | Brash |
| 7,926,222 B2 | 4/2011 | Molnar et al. |
| 7,975,657 B2 | 7/2011 | Okayasu |
| 8,221,678 B2 | 7/2012 | Hedman |
| 2001/0004813 A1 | 6/2001 | Hedman |
| 2002/0066223 A1 | 6/2002 | Hedman et al. |
| 2003/0026727 A1 | 2/2003 | Topp |
| 2003/0029605 A1 | 2/2003 | Lebrun |
| 2003/0061757 A1 | 4/2003 | Askin |
| 2004/0028554 A1 | 2/2004 | Hedman |
| 2004/0035044 A1 | 2/2004 | Topp |
| 2004/0154213 A1 | 8/2004 | Mosher |
| 2004/0237382 A1 | 12/2004 | Durand et al. |
| 2004/0244276 A1 | 12/2004 | Durand et al. |
| 2005/0108920 A1 | 5/2005 | Takenoshita |
| 2005/0220662 A1 | 10/2005 | Hedman |
| 2005/0246942 A1 | 11/2005 | Mueller |
| 2005/0268543 A1 | 12/2005 | Hicks et al. |
| 2006/0010791 A1 | 1/2006 | Topp |
| 2007/0023980 A1 | 2/2007 | Abaraw |
| 2007/0084105 A1 | 4/2007 | Lindsay et al. |
| 2007/0204862 A1 | 9/2007 | Cowan |
| 2007/0258853 A1 | 11/2007 | Burton |
| 2008/0156786 A1 | 7/2008 | Choi |
| 2008/0202741 A1 | 8/2008 | Lee et al. |
| 2008/0260364 A1 | 10/2008 | Vandrak et al. |
| 2008/0302351 A1 | 12/2008 | Hunter et al. |
| 2008/0314674 A1 | 12/2008 | Kamio |
| 2009/0071062 A1 | 3/2009 | Hedman |
| 2009/0085713 A1 | 4/2009 | Tsang |
| 2009/0126909 A1 | 5/2009 | Ellsworth |
| 2009/0211148 A1 | 8/2009 | McCarty |
| 2010/0037512 A1 | 2/2010 | Durand |
| 2010/0294257 A1 | 11/2010 | Thayer et al. |
| 2011/0108015 A1 | 5/2011 | Jamieson |
| 2011/0289825 A1 | 12/2011 | James |
| 2011/0290228 A1 | 12/2011 | Tsunekawa et al. |
| 2011/0290229 A1 | 12/2011 | Manning |
| 2011/0308139 A1 | 12/2011 | James |
| 2012/0102818 A1 | 5/2012 | Rogacki et al. |
| 2012/0180381 A1 | 7/2012 | DeMonte et al. |
| 2012/0186139 A1 | 7/2012 | O'Brien et al. |
| 2012/0204478 A1 | 8/2012 | Gere et al. |
| 2012/0233907 A1 | 9/2012 | Pattison et al. |
| 2012/0255219 A1 | 10/2012 | DeMonte et al. |
| 2012/0255220 A1 | 10/2012 | DeMonte et al. |
| 2012/0304528 A1 | 12/2012 | Hosli et al. |
| 2012/0317870 A1 | 12/2012 | Pratt |

FOREIGN PATENT DOCUMENTS

| | | |
|---|---|---|
| DE | 19746026 | 6/1998 |
| DE | 19741722 | 3/1999 |
| DE | 19950634 | 5/2001 |
| DE | 10300169 | 7/2004 |
| EP | 963694 | 12/1999 |
| GB | 2 280 851 A | 2/1995 |
| JP | 2009072167 | 4/2009 |
| WO | 2009/049389 | 4/2009 |

OTHER PUBLICATIONS

Qarles, W., "Thermal Pest Eradication in Structures," vol. XXVIII, #5/6, May/Jun. 2006, http://www.birc.org/MayJune2006.pdf (Accessed Dec. 30, 2010).

De Monte et al., U.S. Appl. No. 13/080,970, filed Apr. 6, 2011, "Self-Contained Heating Unit for Thermal Pest Control" Apr. 6, 2011.

O'Brien et al., U.S. Appl. No. 13/013,560, filed Jan. 25, 2011 "Portable Heating System and Method for Pest Control", Jan. 25, 2011.

DeMonte et al., U.S. Appl. No. 13/224,998, filed Sep. 2, 2011 "Self-Contained Heating Unit for Thermal Pest Control" Sep. 2, 2011.

T. R. DeMonte, U.S. Appl. No. 13/080,970, Non-final office action from U.S. Patent and Trademark Office mailed May 11, 2012.

(56) References Cited

OTHER PUBLICATIONS

T. R. DeMonte, U.S. Appl. No. 13/224,998, Non-final office action from the U.S. Patent and Trademark Office mailed Feb. 1, 2012.
European Patent Office Communication dated Aug. 8, 2012 regarding Application No. 11195438.4-1260.
T. R. DeMonte et al., U.S. Appl. No. 13/080,970, Final Office Action from the U.S. Patent and Trademark Office mailed Oct. 26, 2012.
DeMonte et al., U.S. Appl. No. 13/224,998, Non-final Office Actions from U.S. Patent and Trademark Office dated Jan. 11, 2013 and Jan. 24, 2013.
T. R. DeMonte, U.S. Appl. No. 13/224,998, Final office action from the U.S. Patent and Trademark Office mailed Sep. 21, 2012.
T. S. O'Brien at al., U.S. Appl. No. 13/013,560, *USPTO Final Office Action*, Jun. 19, 2013.
T. S. O'Brien et al., U.S. Appl. No. 13/013,560, USPTO Non-final Office Action, Sep. 26, 2013.
T. S. O'Brien et al., U.S. Appl. No. 13/013,560, Non-final Office Action from the U.S. Patent and Trademark Office, Mar. 26, 2013.
European Patent Office Communication dated Apr. 9, 2013 regarding Application No. 11195438.4-1655.

\* cited by examiner

HYDRONIC HEATING SYSTEM AND METHOD FOR PEST CONTROL

TECHNICAL FIELD

This invention relates generally to pest control and more particularly to a hydronic heating system and method for killing bed bugs in an affected area.

BACKGROUND OF THE INVENTION

It is not uncommon for pests such as bed bugs and other insects to infest structures and other enclosed spaces that are also inhabited or otherwise used by humans. This is particularly true in enclosed spaces that are located within certain climates and/or enclosed spaces that are frequented by the public. The insects, which generally hide during the day, emerge from cracks and crevices at night to feast on human blood while the human inhabitants are asleep. For example, hotels may become infested with bed bugs or other pests when those insects are brought in by overnight guests. The problem is not isolated to hotels that service over night visitors, however. Other spaces that may become infested include office and commercial buildings, private dwellings, and vehicles. Accordingly, the need exists for effective and efficient systems and methods for killing and removing bed bugs and other pests within an enclosed area. Systems and methods for the removal of bed bugs and other pests, however, have proven inadequate in various respects.

SUMMARY OF THE INVENTION

According to embodiments of the present disclosure, disadvantages and problems associated with previous systems for killing and/or removing pests such as bed bugs from an affected area may be reduced or eliminated.

In certain embodiments, a system for removing pests from an affected area includes a burner for heating a fluid. Heat exchanger units are placed within associated regions of the affected area. Each heat exchanger unit receives the fluid from the burner and emits heated air by transferring heat from the fluid to ambient air within the affected area. Air movers are positioned to circulate the heated air emitted by the heat exchanger units and prevent temperature stratification of the heated air. A temperature difference between the fluid received by the heat exchanger units and the ambient air within the affected area results the affected area being raised to a target temperature greater than 122 degrees Fahrenheit.

Particular embodiments of the present disclosure may provide one or more technical advantages. For example, the temperature within an affected area may be elevated to a temperature suitable for killing bed bugs and other pests without causing damage to the affected area or its contents. In particular, the temperature of an affected area may be thoroughly and uniformly heated to a temperature that is approximately 140 degrees Fahrenheit. Such a temperature has been shown to be effective in killing bed bugs and other pests that have infested the area without causing damage to the structure or its contents. An additional advantage may be that treatment temperatures on the order of approximately 140 degrees Fahrenheit may be tolerated by persons entering the affected area during treatment. Accordingly, structures such as hotels, office spaces, commercial buildings, private dwellings, and vehicles may be rid of bed bug infestations.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
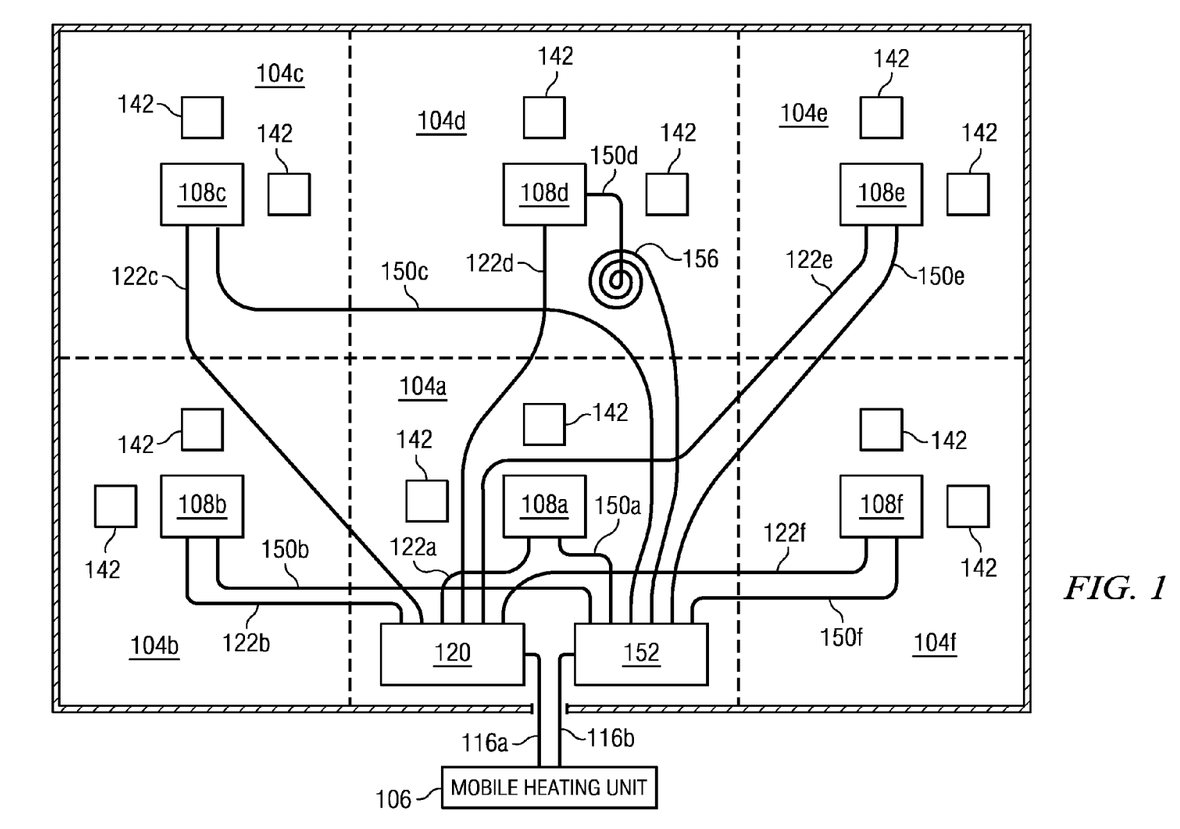
FIG. 1 illustrates an example hydronic system for pest control, according to certain embodiments of the present disclosure.

FIG. 1 illustrates an example hydronic system 100 for pest control, according to certain embodiments of the present disclosure. In general, system 100 includes equipment and components for heating an affected area 102 and its contents to a temperature sufficient to kill bed bugs and other insects that may have infested affected area 102. The term "affected area" is intended to include any enclosed space that may become infested with bed bugs or other insects or pests. Though an affected area 102 may typically include a space within an interior of the building or other structure, it is recognized that the affected area 102 may include any enclosed space that is interior or exterior to a structure. In certain embodiments, affected area 102 may include a building or structure or any portion thereof. For example, affected area 102 may include a hotel, an office space, a commercial building, or a private dwelling. However, affected area 102 may also include a personal vehicle or a vehicle used in mass transportation such as a bus or airplane. Any of the described structures or other enclosed spaces may require treatment when the enclosed space becomes infested with bed bugs or other pests. Affected area 102 may be considered an acute infestation site where there has been visual confirmation of a nesting area of bedbugs or other insects or where a trained scent detection dog has alerted to the presence of bedbugs. Generally, a nesting area may include several to dozens of bed bugs.

Affected area 102 may be divided into multiple smaller regions 104a-f. In certain embodiments, treatment may be localized and monitored for each region. This may be particularly appropriate during the treatment of large spaces such as hotels, offices, commercial buildings, and private dwellings. In certain other embodiments, treatment may monitored for affected area 102 as a whole. During treatment of affected area 102, the internal temperature of affected area 102 and the contents contained therein may be increased to an elevated temperature sufficient to result in the killing of bed bugs and other insects or pests. Generally, a mobile heating unit 106 may be located external to affected area 102 and may be used to heat a fluid that is then transported via one or more tubes or hoses to one or more heat exchangers 108 within the regions 104a-f of affected area 102. In particular embodiments, a heat exchanger unit 108 may be associated with each region 104. As will be described in more detail below, mobile heater unit 106, heat exchangers 108a-f, and the fluid received by these components may cooperate to heat affected area 102 to a target temperature that is sufficient to kill pests such as bed bugs and other insects.

Figure 2:
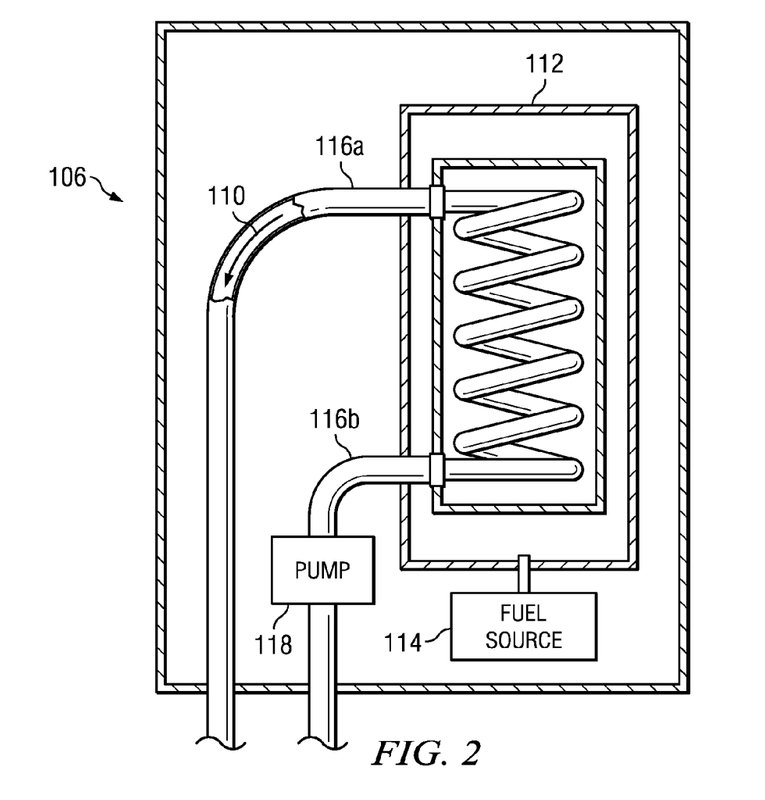
FIG. 2 illustrates an example mobile heating unit for use in conjunction with the hydronic system depicted in FIG. 1, according to certain embodiments of the present disclosure.

Mobile heating unit 106 operates to continually circulated a fluid 110 through system 100. FIG. 2 illustrates an example mobile heating unit 106 for use in conjunction with the hydronic system 100 depicted in FIG. 1, according to certain embodiments of the present disclosure. As depicted, mobile heating unit 106 includes a burner 112 that is powered by a fuel source 114. Fluid 110 may be transported to, from, and/or through mobile heating unit 106 via one or more hoses 116. Specifically, a pump 118 may receive fluid 110 via hoses 116 and operate to circulate fluid 110 to burner 112 and through system 100, generally.

In certain embodiments, fuel source 114 may include diesel. However, it is generally recognized that propane, natural gas, or any other material that can be used to produce energy for powering burner 112 and heating fluid 110 may be used. Likewise, though fluid 110 may include water, glycol, or a combination of water and glycol, it is recognized that fluid 110 may include any fluid or combination of fluid appropriate for convective heat transfer.

In operation, pump 118 receives fluid via a hose 116 and pushes fluid 110 through burner 112, which is heated by fuel source 114. Burner 112 transfers heat derived from fuel source 114 to fluid 110. In certain embodiments, burner 112 may include a thermostat 111 or other controller that may be used to modulate or selectively control the temperature of fluid 110 such that a target temperature of fluid 110 is reached. Thermostat 111 may include predefined settings that cause the temperature of the heat transfer fluid 110 to be increased until an affected area 102 reaches a desired temperature and then decrease when affected area 102 reaches the desired temperature. For example, burner 112 may include a thermostat that is set to increase the temperature of the heat transfer fluid 110 before the temperature of the ambient air in affected area 102 reaches a temperature of 140 degrees Fahrenheit and then decrease the temperature of the heat transfer fluid 110 when the temperature of the ambient air in affected area 102 reaches the target temperature.

As another example, burner 112 may include an aquastat thermometer that is set to shut burner 112 off when the temperature of fluid 110 exceeds an upper limit and then cycle burner 112 back on when the temperature of fluid 110 dips below a lower limit. In certain embodiments, thermostat 111 may control the operation of burner 112 such that fluid 110 is heated to a target temperature of greater than 170 degrees Fahrenheit. In a particular embodiment, for example, thermostat 111 may control the temperature of burner 112 such that fluid 110 is heated to a target temperature of approximately 185 to 195 degrees Fahrenheit.

The temperature of fluid 110 may be selected based on the temperature that is to be achieved within affected area 102 during the treatment process. For example, an ambient air temperature of approximately 122 degrees Fahrenheit may be sufficient in the eradication of bed bugs and other insects. Because the heat is derived from the heated fluid 110, the temperature of fluid 110 may be selected to ensure that the target temperature within affected area 102 is greater than 122 degrees Fahrenheit, in certain embodiments. In a particular embodiment, a fluid temperature greater than 170 degrees Fahrenheit may result in the temperature within affected area 102 reaching the a temperature greater than approximately 122 degrees Fahrenheit.

In certain embodiments, merely heating the air within affected area 102 to a temperature of 122 degrees Fahrenheit may be insufficient to ensure that all contents within affected area 102 are adequately and thoroughly heated throughout to the minimum temperature of 122 degrees Fahrenheit. Accordingly, in a particular embodiment, a target temperature of approximately 135 to 145 degrees Fahrenheit may be desired within affected area 102. Such a temperature may more readily ensure that all areas of affected area 102 and all contents within affected area 102 are thoroughly and entirely heated above the minimum temperature required to kill the bed bugs or other pests. Because the heat is derived from the heated fluid 110, the temperature of fluid 110 may be selected to ensure that the target temperature within affected area 102 approximates 135 to 145 degrees Fahrenheit, in certain embodiments. In a particular embodiment, a fluid temperature on the order of approximately 180 to 195 degrees Fahrenheit may result in the temperature within affected area 102 reaching the desired 135 to 145 degrees Fahrenheit.

In certain embodiments, mobile heating unit 106 may be housed in a trailer or commercial truck such that the components of mobile heating unit 106 (i.e., fuel source 204, burner 202, and pump 208) may be easily moved to and from a job site. In addition to housing mobile heating unit 106, the trailer or commercial truck may include adequate storage space for storing other components of system 100 during transport to and from the jobsite. For example, storage space within the trailer may be used to store heat exchangers 108, any required hoses such as hoses 116, extension cords, fans, or other equipment while the items are being transported to and from the job site and when they are not being to treat an infested area. Where mobile heating unit 106 is contained within a trailer or commercial vehicle, an ingress/egress may be built into one or more sides or doors of the trailer or vehicle to receive hoses 116.

Returning to FIG. 1, at least one of hoses 116 (shown as supply hose 116a) is used to transport heated fluid 110 from mobile heating unit 106 to affected area 102. Thus, supply hose 116a may extend from mobile heating unit 106 to a component of system 100 located in or proximate to affected area 102. In certain embodiments, supply hose 116a may extend from mobile heating unit 105 to a supply manifold 120. Supply hose 116a may transport fluid to supply manifold 120. In the depicted example, supply manifold 120 is located within affected area 102. However, it may be desirable in certain embodiments, to place supply manifold 120 outside affected area 102.

Figure 3:
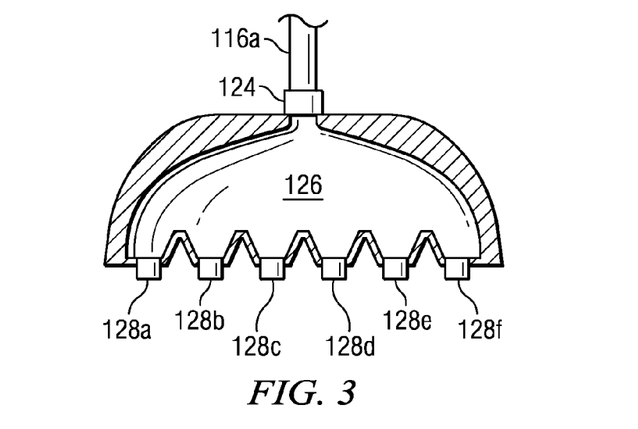
FIG. 3 illustrates an example manifold for use in conjunction with the hydronic system depicted in FIG. 1, according to certain embodiments of the present disclosure.

FIG. 3 illustrates an example supply manifold 120 for use in conjunction with the hydronic system 100 depicted in FIG. 1, according to certain embodiments of the present disclosure. Generally, supply manifold 120 operates as a junction for the splitting a single stream of fluid 110 received from mobile heating unit 106 into multiple streams of fluid 110 that may be transported to heat exchangers 108a-f. Specifically, supply manifold 120 comprises a channel that is configured to split fluid 110 received via supply hose 116a into multiple fluid streams that are transported via supply lines 122a-f to heat exchangers 108a-f. Thus, supply manifold 120 includes a single input port 124, an interior channel 126, and multiple output ports 128.

In a particular embodiment where system 100 includes six heat exchangers 108a-f, as depicted in FIG. 1, supply manifold 120 provides a junction for splitting fluid received via supply hose 116a into six fluid streams that are carried via six supply lines 122a-f to the six heat exchangers 108a-f. Thus, as depicted in FIG. 3, supply manifold 120 includes a single input port 124 that couples to supply hose 116a. For splitting fluid 110 into the six fluid streams for the six respective heat exchangers 108, supply manifold 120 also includes six output ports 128a-f. In operation, fluid 110 enters supply manifold 120 through input port 124. The fluid 110 then travels through interior channel 126 where it is split to six fluid streams. The six fluid streams exit supply manifold 120 through the six output ports 128a-f. Each of the six output ports 128a-f are coupled to a supply line 122a-f.

The diameters of supply hose 116a and supply lines 122a-f may be selected to maintain a desired level of fluid flow within the hoses. In a particular embodiment, supply hose 116a may have a diameter of approximately 1 inch. Accordingly, input port 124 may be of any appropriate size to receive and couple to the hose having a diameter of approximately 1 inch. To maintain the adequate fluid flow, each of supply lines 122a-f may have a diameter of approximately ¾ of an inch, in certain embodiments. Thus, each of output ports 128a-f may be of the appropriate size and configuration to receive and couple to a hose having a diameter of approximately ¾ of an inch. It is generally recognized, however, that the dimensions described are mere examples, and supply hose 116a and supply lines 122a-f may be of any suitable diameter for maintaining the desired fluid flow within system 100. Likewise, input port 124 and output ports 128a-f may be any size and configuration to facilitate the coupling of the hoses to supply manifold 120.

Returning to FIG. 1, heat exchangers 108a-f receive fluid 110 heated by mobile heating unit 106 via supply lines 122a-f. To ensure that the interior of affected area 102 is thoroughly and uniformly heated to a temperature that is proximate the target temperature, multiple heat exchangers 108a-f may be placed at multiple locations within affected area 102.

Specifically, the interior of affected area 102 may be divided into as many regions 104a-f as necessary based on the square footage or volume of affected area 102 and the amount of heat that each heat exchanger unit 108a-f is capable of providing. In certain embodiments, each heat exchanger unit 108 may be capable of heating an area of approximately 300 square feet to a target temperature greater than 122 degrees. In a particular embodiment, for example, each heat exchanger unit 108 may be capable of heating an area to a target temperature of approximately 135 to 145 degrees Fahrenheit. As described above, such temperatures have been shown to be adequate for killing bed bugs and other pests. Additionally, such a temperature may be sufficient in ensuring that the entirety of affected area 102 reaches at least the minimum temperature required. As a further advantage, a temperature of greater than 122 degrees Fahrenheit may be tolerated by persons and most contents. Where each heat exchanger unit 108 is capable of servicing a region 104a-f of approximately 300 square feet during the treatment process, an affected area 102 covering an area of approximately 1800 total square feet may be divided into six regions 104a-f of approximately 300 square feet each. A heat exchanger unit 108a-f may then be selectively positioned in the center of each region 104a-f for the effective treatment of bed bugs contained within the regions 104a-f of affected area 102.

Figure 4:
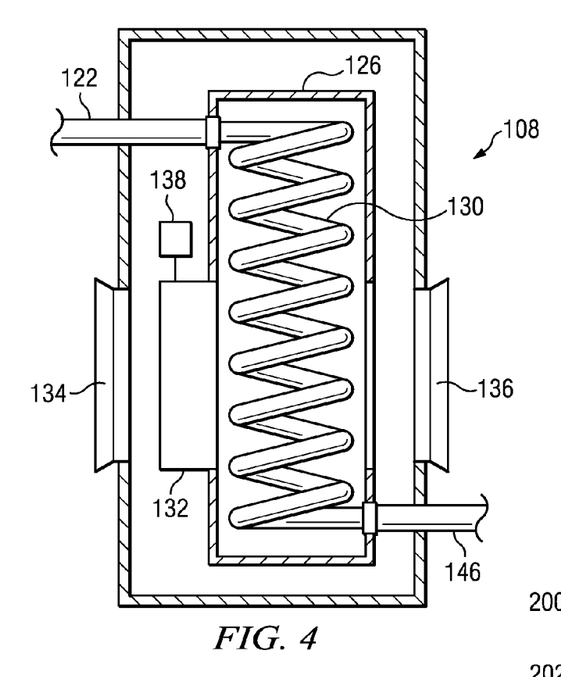
FIG. 4 illustrates an example heat exchanger unit for use in conjunction with the hydronic system depicted in FIG. 1, according to certain embodiments of the present disclosure.

FIG. 4 illustrates an example heat exchanger unit 108 for use in conjunction with the hydronic system depicted in FIG. 1, according to certain embodiments of the present disclosure. As depicted, heat exchanger unit 108 comprises a self-contained hydronic heating coil and fan unit. Thus, heat exchanger unit 108 includes both a heat exchanger 126 and a power fan 128. Heat exchanger 126 may include a fluid-to-air heat exchanger or radiator that transfers thermal energy from fluid 110 to air that is blown over radiator 126 by fan 128. In this manner, heat exchanger unit 108 may be used to heat the ambient air in the area surrounding heat exchanger 126 to the desired temperature. Where heat exchanger unit 108 includes both a heat exchanger and a fan 128, heat exchanger unit 108 may be referred to as a "fan coil."

Specifically, heated fluid 110 is received by heat exchanger unit 108 via supply line 122. The heated fluid 110 is received at a first temperature. The heated fluid 110 is circulated through one or more tubes or pipes 130 in radiator 126. While fluid 110 is being circulated through radiator 126, a fan 128 is operated to draw in ambient air 132 from the area surrounding heat exchanger unit 108. The air 132 may be drawn in through an opening 134 and may be received at a second temperature that is generally equal to the temperature of the enclosed space. As the air 132 is blown across radiator 126, the heat in fluid 110 conducts to the outer surface of radiator 126 and transfers into the cooler ambient air 132. The difference in the temperature between the heated fluid 110 at the first temperature and the ambient air 132 at the second temperature causes the temperature of ambient air 132 to increase to a third temperature as it is blown over radiator 126 by fan 128. The heated air 132 then exits heat exchanger unit 108 through an exit opening 136 and is pushed by fan 128 into an associated region 104 of affected area 102.

In certain embodiments, heat exchanger unit 108 may include a thermostat 138 for controlling heat output. Thermostat 138 may operate to measure the temperature of ambient air 132 as it is being received by heat exchanger unit 108.

In certain embodiments, thermostat 138 may be used to selectively control fan 128 in response to the temperature of ambient air 132. Specifically, in certain embodiments, thermostat 138 may be set to shut fan 128 off when the temperature of air 132 being received exceeds an upper limit. Thermostat 138 may also be set to turn fan 128 on when the temperature of air 132 being received dips below a lower limit. For example, where a target temperature in the range of 135 to 145 degrees Fahrenheit is desired for the eradication of bed bugs within affected area 102, thermostat 138 may be set to shut fan 128 off when the temperature of air 132 being received in opening 134 exceeds 145 degrees Fahrenheit. Thermostat 138 may be then be set to turn fan 128 on when the temperature of air 132 being received in opening 134 dips below 135 degrees Fahrenheit. Alternatively, where a target temperature of approximately 140 degrees Fahrenheit is desired, thermostat 138 may be set to shut fan 128 off when the temperature of the ambient air 132 being received by heat exchanger unit 108 is equal to or below 140 degrees Fahrenheit and turn fan 128 on when the temperature of ambient air 132 being received by heat exchanger unit 108 is above 140 degrees Fahrenheit.

In certain other embodiment, thermostat 138 may be used to cause heated fluid 110 to bypass heat exchanger unit 108 in response to the temperature of ambient air 132. Specifically, in certain embodiments, thermostat 138 may be set to cause heated fluid 110 to bypass heat exchanger unit 108 when the temperature of air 132 being received exceeds an upper limit. Thermostat 138 may also be set to cause heated fluid 110 to not bypass heat exchanger unit 108 when the temperature of air 132 being received dips below a lower limit. For example, where a target temperature in the range of 135 to 145 degrees Fahrenheit is desired for the eradication of bed bugs within affected area 102, thermostat 138 may be set to cause heated fluid 110 to bypass heat exchanger unit 108 when the temperature of air 132 being received in opening 134 exceeds 145 degrees Fahrenheit. Thermostat 138 may be then be set to cause heated fluid 110 to not bypass heat exchanger unit 108 when the temperature of air 132 being received in opening 134 dips below 135 degrees Fahrenheit. Alternatively, where a target temperature of approximately 140 degrees Fahrenheit is desired, thermostat 138 may be set to cause heated fluid 110 to bypass heat exchanger unit 108 when the temperature of the ambient air 132 being received by heat exchanger unit 108 is above 140 degrees Fahrenheit and cause heated fluid 110 not to bypass heat exchanger unit 108 when the temperature of ambient air 132 being received by heat exchanger unit 108 is equal to or below 140 degrees Fahrenheit.

In certain embodiments, an infrared and/or wireless thermometer may be used to verify that the area within affected area 102 is thoroughly heated to the desired temperature.

Returning to FIG. 1, each region 104 of affected area 102 may include at least one air mover 142 for further circulating the heat emitted by heat exchanger unit 108. It is generally recognized that heated air 132 rises toward the ceiling of affected area 102 upon exiting heat exchanger unit 108. To prevent the natural rise of hot air, one or more air movers 142 may be positioned proximate each heat exchanger unit 108. In certain embodiments, the air movers 142 may include standard propeller type fans. However, it is recognized that any suitable devices for producing a current of air may be used to better circulate the air emitted by heat exchangers 108a-f.

Multiple air movers 142 may be positioned within a region 104a-f associated with a heat exchanger unit 108a-f. In certain embodiments, the ratio of air movers 142 to heat exchanger units 108a-f may be at least two air movers for every heat exchanger unit 108a-f. While any appropriate number of air movers 142 may be used, it may be appropriate in some regions 104a-f to use two or three air movers 142 for each heat exchanger unit 108a-f. One or more additional air movers 142 may also be selectively positioned relative to heat exchanger 108 or another air mover 142 to promote the circulation of air through the treatment area 104a-f in a desired direction. For example, air movers 142 may be positioned relative to heat exchanger units 108a-f such that a clock-wise or counter-clockwise airflow pattern is achieved through treatment area 104a-f. Additionally, one or more air movers 142 may be positioned along walls and pointed in a direction to further facilitate the desired circulation pattern.

Additionally or alternatively, one or more air movers 142 may be positioned to promote circulation through closets or other hard-to-heat areas within regions 104a-f. For example, sliding closet doors may be moved to a center position in the doorway. An air mover 142 may then be positioned to blow heated air 132 into the opening on one side of the door and allowed to exhaust out the opening on the other side of the door.

To further aid in the circulation of heated air and prevent the natural rising of heated air, the output side of air mover 142 may be configured to direct air output by air mover 142 toward the floor of the affected area 102. For example, the configuration of output side of air mover 142 may be such that the heated air is directed towards the baseboards or floor of affected area 102. In certain embodiments, the output side of air mover 142 may include a modified circle that includes on elongated corner configured to direct air in a generally downward direction. An example of such an air mover may be that sold under the name Phoenix Axial Air Mover with FOCUS™ Technology or Quest Air AMS 30 by Therma-Stor, L.L.C., which is described in U.S. Pat. No. 7,331,759 issued Marco A. Tejeda and assigned to Technologies Holdings Corp. of Houston, Tex.

As described above, heated fluid 110 may be continuously cycled through system 100. Thus, heated fluid 110 that is received and used by heat exchanger units 108 to heat the ambient area in a treatment area 104 may be returned to mobile heating unit 106. As described above, heat exchanger units 108 may receive the fluid 110 at a temperature of approximately 185 to 195 degrees Fahrenheit, in certain embodiments. However, as heat exchanger units 108 transfer the thermal energy in heated fluid 110 to air 132 that is received by heat exchanger units 108, the temperature of heated fluid 110 may decrease. For example, the temperature of heated fluid 110 may decrease approximately 10 degrees as the fluid passes through heat exchanger unit 108. Accordingly, where heated fluid 110 is received by heat exchanger unit 108 at a temperature on the order of 185 to 195 degrees Fahrenheit, fluid 110 may exit heat exchanger unit 108 via an exit port 146 (depicted in FIG. 4) at a temperature on the order of approximately 175 to 185 degrees Fahrenheit. The lower temperature fluid 110 is then returned to mobile heating unit 106 for reheating and recirculation through system 100.

To return fluid 110 to mobile heating unit 106, each heat exchanger unit 108 may be coupled to a return line 150a-f. Return lines 150a-f transfer fluid 110 from areas 104a-f to a return manifold 152 that may be located near an ingress of affected area 102, in certain embodiments. It is generally recognized that return manifold may be configured substantially like supply manifold 120 described above with regard to FIG. 3. However, in contrast to supply manifold 120, return manifold 152 may include multiple input ports for receiving multiple fluid streams from return lines 150a-f and a single output port for transporting a single fluid stream to mobile heating unit 106. As such, multiple streams of fluid 110 may be received at the input ports of return manifold 152. Return manifold 152 may be configured to then merge the multiple input streams of fluid 110 into a single return fluid stream that is returned to mobile heating unit 106 via a return supply hose 116b.

Similar to supply hose 116a and supply lines 150a-f, the diameters of return hose 116b and return lines 150a-f may be selected to maintain a desired level of fluid flow within the hoses. Accordingly, in a particular embodiment, each of return lines 150a-f may have a diameter of approximately ¾ of an inch. Accordingly, each output port of return manifold 152 may be of any appropriate size to receive and couple to the hose having a diameter of approximately ¾ of an inch. In contrast, return line 116b may have a diameter of approximately 1 inch, and a corresponding output port may be of the appropriate size and configuration to receive and couple to a hose having a diameter of approximately 1 inch. Similar to supply hose 116a and supply lines 150a-f, however, it generally recognized that the described dimensions are for example purposes only. Return hose 116b and return lines 150a-f may be of any suitable diameter for maintaining the desired fluid flow within system 100.

Some items or areas within affected area 102 may be considered hard to heat areas. Such items or areas may include items stored in closets and drawers. Large soft items such as couch cushions and mattresses may also be considered hard-to-heat items. Hard-to-heat items may not reach the temperature required to kill the bed bugs or other pests during the treatment process unless adequate steps are taken to ensure complete and thorough heating. Accordingly, additional measures may be taken to ensure thorough distribution of heat through an affected area 102 and its infested contents in some instances.

As one example, the temperature radiated by the hoses carrying fluid 110 may be thermally transferred to hard-to-heat areas and items. Specifically, one or more of supply hose 116a, return hose 116b, supply lines 122a-f, and/or return lines 150a-f may be coiled in a region 104 of affected area 102. As depicted in FIG. 1, for example, region 104d includes a pile 156 of coiled return line 150d. Pile 156 of coiled return line 150d may be placed in a hard-to-heat area such as a closet or a corner. Return line 150d, which is used to transport fluid 110 at a temperature of approximately 175 to 185 degrees Fahrenheit may naturally transfer heat that may be used to elevate the temperature of a portion of region 104 that might otherwise not reach the desired temperature. Since supply hose 116a and supply lines 122a-f may transport fluid at temperatures even higher than that transported by return lines 150a-f, supply hose 116a and supply lines 122a-f may be effective in providing additional thermal energy to hard-to-heat areas than return lines 150a-f.

It is also recognized that tightly packed contents within affected area 102 may be resistant to being completely heated throughout. This may be particularly true for the contents within closets and drawers. For example, items hung on hangers that are closely packed together may be heated to the desired temperature on the some exposed surfaces but the centers of such items may not reach temperatures required to kill any bugs or other pests located on such items. To ensure thorough heating, the items within closets or other tight spaces may be separated such that each item may be sufficiently enveloped in the heat emitted from system 100. Similarly, stacked articles such as clothing or towels may be separated so that the items do not touch one another. As a result, heat more readily circulates around and through the items.

As another example, furniture may be positioned at least six to 12 inches away from walls to facilitate air flow into the furniture and through the room. Additionally, the cushions from a couch may be removed and separated. Mattresses and box springs may be separated from one another and turned on their sides and propped against each other to form an upside down "V". Positioning the mattress and box springs in this manner facilitates air flow across the surfaces having the most surface area.

In some instances, merely separating the items may not ensure thorough and complete heating of the articles. A more effective method for providing thorough and complete treatment of the items may include placing the items directly on the hoses that are used to transport fluid 110. Accordingly, items may be removed from closets and drawers in some instances. Likewise, items that are stacked or piled may be separated. The items from the closets, drawers, and piles may then be placed on top of hose 116, supply line 122a-f, return line 150a-f, or pile 156 of coiled hoses. As just one example, the cushions from a couch or other piece of furniture may be removed and placed on the hoses. Heat may then be transferred directly from the hoses into the couch cushions or other articles. Bed bugs or other pests that have infested the couch cushions may be killed when the couch cushions absorb enough heat from the hose to raise the internal temperature of the couch cushion to a temperature on the order of approximately 135 to 145 degrees Fahrenheit but not less than 122 degrees Fahrenheit.

Additionally or alternatively, a person responsible for performing the treatment of affected area 102 may enter the affected area 102 and rearrange hard-to-treat items midway through the treatment process. Stated differently, a person may enter the affected area 102 and specifically expose its contents to the high temperature ambient air in the affected area 102. For example, midway through the treatment process, the person may individually expose articles such as clothing, pillows, bedding, towels, and other soft items to the high temperature ambient air. Where the ambient air in affected area 102 has reached the required temperature for killing the bed bugs or other pests, exposing the items to the high temperature ambient air (e.g., by placing the items in front of an air mover 142 or a heat exchanger 108) may increase the internal temperature of the item to a level sufficient to rid the item of live bed bugs or other insects. Similarly, items may be rearranged midway through the treatment process. For example, furniture may be rearranged such that a couch is stood up on end to ensure that the underside of the cushions and the underside of the couch are heated to the required temperature.

Various modifications may be made to system 100. For example, though the target temperature of affected area 102 during treatment may be approximately 135 to 145 degrees Fahrenheit, the provided temperature range is just one example of a suitable temperature range that may be used to effectively rid a affected area 102 of a bed bug or other insect infestation.

As another example, though it is described above that a heat exchanger may be provided for every 300 square feet of area within affected area 102, more or less heat exchanger units may be used per square foot. In certain embodiments, the number of heat exchanger units 108 used may depend additional factors. For example, more heat exchanger units may be required for an area below grade. Thus, while only one heat exchanger unit may be required to sufficiently elevate the temperature of a 300 square foot area on a level of a dwelling that is above grade, more heater exchanger units 108 may be required to sufficiently elevate the temperature of a 300 square foot area in a basement. In a particular embodiment, two heat exchanger units may be required for every 300 square feet in a basement or other below-grade area. Likewise, more heat exchanger units may be required to thoroughly and sufficiently elevate the contents of affected area 102 when that area is cluttered with an excessive amount of contents. Thus, in particular embodiments, two heat exchanger units 108 may be required for every 300 square feet in an affected area having an excessive amount of contents. Naturally, it also follows that more than two heat exchanger units 108 may be required for every 300 square feet of area where that area is both below grade and contains an excessive amount of contents.

Figure 5:
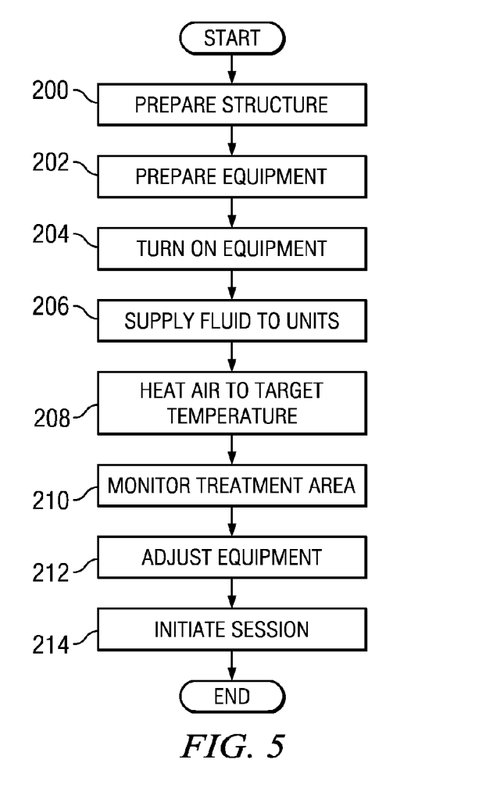
FIG. 5 illustrates an example hydronic method for pest control, according to certain embodiments of the present disclosure.

FIG. 5 illustrates an example hydronic method for pest control, according to certain embodiments of the present disclosure. The method begins with the preparation of the affected area 102 at step 200. Preparing affected area 102 may include capping any sprinkler heads with insulating caps. Insulating caps may include a hollow, modified-hemispherical shaped Styrofoam cover that are attached to the sprinkler head. In certain embodiments, dry-ice or frozen ice packs can be placed inside the insulating cap to cool the sprinkler heads during the treatment process and further ensure that the sprinkler heads will not trigger during the treatment process. Additionally, preparing the affected area 102 may include removing heat sensitive contents from the infested area. Heat sensitive contents may include any material, equipment, or other contents that could be harmed by temperatures that reach or exceed approximately 135 degrees Fahrenheit. Items that fall within this category may be treated separately outside of the affected area.

At step 202, the equipment used in the treatment process is prepared. Preparation of the equipment may include positioning the mobile heating unit 106 relative to the affected area 102. In a particular embodiment, mobile heating unit 106 may be positioned within 600 feet horizontally and 100 feet vertically from an ingress point to affected area 102. Additionally, supply manifold 120 and return manifold 152 may be positioned within the affected area 102 at a location that is preferably close to an ingress of affected area 102. The hoses and lines of system 100 may then be distributed. For example, each of main supply hose 116a and main return hose 116b may be coupled to mobile heating unit 106 and the appropriate ports of supply manifold 120 and return manifold 152, respectively.

Further preparation of the equipment may include placing heat exchanger units 108 and air movers 142 in the appropriate locations within affected area 102. As described above, affected area 102 may be divided into regions 104, and a heat exchanger unit 108 may be positioned within each 300 square foot region, in certain embodiments. Air movers 142 may then be positioned proximate heat exchanger units and in any configuration suitable for facilitating a desired circulation pattern. Supply lines 122a-f and return lines 150a-f may then be routed from the supply manifold 120 and return manifold 150, respectively, to each heat exchanging unit 108. Heat exchanger units 108a-f may then be turned on.

Additional preparations may include the placement of one or more infrared and/or wireless thermometers within affected area 102. For example, a thermometer may be placed within each region 104a-f. In certain embodiments, infrared or wireless thermometers may be placed in the more insulated areas that are harder to thoroughly heat. For example, infrared or wireless thermometers may be placed in corners where poor air flow is anticipated. Wireless thermometers may also be placed under furniture or under stacks of clothing or other soft articles. In certain embodiments, the thermometers may communicate wirelessly with one or more computers or other control centers. Wireless data-logging software may be used to record the internal temperature of affected area 102 both prior to and during the treatment process.

At step 204, the equipment may be turned on. Specifically, each of mobile heating unit 106 and heat exchangers 108a-f may be turned on. In a particular embodiment, a thermostat within mobile heating unit 106 may be set to a temperature on the order of approximately 180 to 195 degrees Fahrenheit. Mobile heating unit 106 may then heat fluid 110 to a temperature within the desired temperature range. For example, the burner may heat a glycol fluid to a temperature on the order of approximately 180 to 195 degrees Fahrenheit. In some instances, the temperature of fluid 110 may be monitored during the warm-up phase. Within affected area 102, heat exchanger units 108 are powered up. The thermostat on each heat exchanger unit 108a-f may be set to a temperature on the order of approximately 135 to 145 degrees Fahrenheit, in certain embodiments. In certain embodiments, heat exchanger units 108a-f may not be powered up until the temperature of fluid 110 reaches a temperature of at least 125 degrees Fahrenheit.

At step 206, the heated fluid 110 is then supplied to the heat exchanger units 108. Specifically, and as described above, a pump 118 associated with mobile heating unit 106 may be used to push heated fluid 110 through a supply line 116a to transport fluid 110 from mobile heating unit 106 to a supply manifold 120. The heated fluid 110 may then be separated into multiple fluid streams. Each fluid stream is transported via supply line 122a-f to a heat exchanger unit 108a-f.

At step 208, the ambient air within affected area 102 is heated to a "warm up" target temperature (e.g., 122 degrees Fahrenheit). Specifically, each heat exchanger unit 108a-f is used to transfer heat from fluid 110 to ambient air 132 flowing through each heat exchanger unit 108a-f. Heat exchanger unit 108a-f receives fluid 110 at a first temperature that may be on the order of approximately 180-195 degrees Fahrenheit, in certain embodiments. In contrast, the ambient air 132 may be received by each heat exchanger unit 108a-f at a second temperature. At the beginning of the treatment process, the temperature of ambient air 132 that is received by each heat exchanger unit 108a-f may be substantially equal to normal room temperature. The temperature difference between fluid 110 at the first temperature and ambient air 132 results in heat transfer from fluid 110 to ambient air 132 as it is blown through heat exchanger unit 108a-f. The heated air is then emitted into affected area 102.

In certain embodiments, air movers 142 may be turned on once the ambient air in the affected area 102 has remained at or above the "warm up" target temperature (e.g., 122 degrees Fahrenheit) for at least fifteen minutes. Air movers 142 operate to circulate the heated air emitted by heat exchanger units 108a-f and prevent stratification of the heated air. Additionally, air movers 142 promote circulation of the heated air 132 around the regions 104a-f. Heated air 132 cycles through the room and may be returned to heat exchanger unit 108a-f where it is again pushed through heat exchanger unit 108a-f until the temperature of ambient air 132 reaches the target temperature.

At step 210, the affected area 102 is monitored. Infrared or wireless thermometers may be used to spot-check the surface temperatures within regions 104a-f. In particular embodiments, a target temperature on the order of 135 to 145 degrees Fahrenheit may be desired. A minimum temperature of approximately 122 degrees Fahrenheit may be desirable to result in the effective treatment of a site infested with bed bugs or other pests. The equipment may be adjusted at step 212 until the desired temperature is obtained. For example, equipment may be repositioned as needed to equalize the rate of heating across regions 104a-f. Additionally, the temperature of fluid 110 may be optionally increased up to a temperature on the order of approximately 195 degrees Fahrenheit if more heat is desired within the affected area 102.

After the temperature of the ambient air in affected area 102 reaches the target temperature, persons involved in the treatment process may enter affected area 102 to individually handle and expose the contents to the high temperature ambient air. Handling the contents may include turning items within affected area 102 to ensure that all surfaces of the contents are exposed to the high temperature ambient air. For example, clothing, furniture, mattresses, box springs, and other moveable contents may be repositioned. Infrared and/or wireless thermometers may be used to check surface temperatures of the contents that are not adequately exposed to air flow. Contents that do not have a temperature reading above the minimum of 122 degrees Fahrenheit may be repositioned. Equipment may be repositioned as well until measurements indicate that all regions 104a-f and all contents within these regions 104a-f reach the target temperature.

At step 214, shut down is initiated. Burner 112 of mobile heating unit 106 may be turned off. Pump 118 within mobile heating unit 106 may be shut off once the temperature of fluid 110 decreases to a temperature where the hoses can be handled comfortably. In a particular embodiment, pump 118 may be shut off when the temperature of fluid 110 falls below 122 degrees Fahrenheit. Heat exchanger units 108a-f may also be turned off. To initiate the cooling of affected area 102 and its contents, air movers 142 may be repositioned. A portion of air movers 142 may be used to blow the heated air out of the affected area 102. Other air movers 142 may be positioned to blow air outside into the affected area 102. Hoses 116 and supply lines 122 and 150 may be removed from affected area 102 when they have cooled enough to be comfortably handled. The contents of affected area 102 may then be returned to their original places within affected area 102.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A system for killing pests in an affected area, comprising:
   a burner operable to heat a fluid to a first temperature;
   a plurality of heat exchanger units each placed with an associated region of the affected area, each heat exchanger unit configured to receive the fluid from the burner, each heat exchanger unit operable to emit heated air by transferring heat from the fluid to ambient air within the affected area;
   a supply manifold positioned between the burner and the plurality of heat exchanger units, the supply manifold comprising;
      a first input port configured to receive the fluid via a supply line from the burner; and
      a plurality of output ports, each output port being coupled to a selected one of a first plurality of hoses each associated with a respective one of the plurality of heat exchanged units, the plurality of output ports supply the fluid to each of the plurality of heat exchanger units; and
   a plurality of air movers positioned to circulate the heated air emitted by the plurality of heat exchanger units and prevent stratification of the heated air, at least one air mover positioned proximate to an associated one of the plurality of heat exchanger units, and
   wherein a temperature difference between the fluid received by the plurality of heat exchanger units and the ambient air within the affected area results in the affected area being raised to a target temperature greater than 122 degrees Fahrenheit.

2. The system of claim 1, wherein:
   the fluid comprises water-glycol mixture; and
   the first temperature is greater than 170 degrees Fahrenheit.

3. The system of claim 1, further comprising a return manifold positioned between the burner and the plurality of heat exchanger units, the return manifold comprising:
   a plurality of input ports, each input port being coupled to a selected one of a second plurality of hoses each associated with a respective one of the plurality of heat exchanger units, the plurality of input ports receiving the fluid from each of the plurality of heat exchanger units; and
   an output port configured to return the fluid received from the plurality of heat exchanger units to the burner for recirculation, the fluid returned to the burner via a return line.

4. The system of claim 1, wherein the plurality of heat exchanger units comprises at least six heat exchanger units for at least six associated regions of the affected area.

5. The system of claim 1, wherein the plurality of heat exchanger units comprises one heat exchanger unit for every 300 square feet within the affected area.

6. The system of claim 1, wherein the plurality of heat exchanger units comprises at least two heat exchanger units for every 300 square feet within the affected area.

7. The system of claim 1, Wherein a ratio of the air movers to the heat exchanger units is at least one to one.

8. The system of claim 1, wherein each of the plurality of heat exchanger units comprises a thermostat configured to cause an associated heat exchanger unit to:
   circulate the heated air when the temperature of the ambient air within the affected area is equal to or below the target temperature; and
   cease circulation of the heated air when the temperature of ambient air within the affected area is above the target temperature.

9. The system of claim 1, wherein the plurality of air movers are configured to circulate the heated air received from the plurality of heat exchanger units toward the floor of the affected area.

10. The system of claim 1, wherein a portion of at least one of the first plurality of hoses is coiled to form a pile of coiled hose such that radiant heat from the portion of the at least one of the first plurality of hoses may be transferred to a hard to heat items within the affected area.

11. The system of claim 1, wherein a plurality of contaminated items are separated within the affected area to ensure that each contaminated item is heated throughout to the target temperature.

12. A system for killing pests in an affected area, comprising:
   a burner operable to heat a water-glycol fluid mixture to a temperature greater than 170 degrees Fahrenheit;
   a supply manifold configured to receive the water-glycol fluid mixture as a single supply fluid stream from the burner, the supply manifold configured to split the single supply fluid stream into a plurality of supply fluid streams, the supply manifold comprising:
      a first input port configured to receive the single supply fluid stream via a supply line from the burner; and
      a plurality of output ports, each output port being coupled to a selected one of a first plurality of hoses for transporting a selected one of the plurality of fluid streams; and
   a plurality of heat exchanger units each placed within an associated region of the affected area, each of the plurality of heat exchanger units coupled to the supply manifold via one of the first plurality of hoses and an associated output port to receive a selected one of the plurality of supply fluid streams, each of the plurality of heat exchanger units operable to emit heated air by transferring heat from the water-glycol fluid mixture to ambient air within the affected area;
   a plurality of air movers positioned to circulate the heated air emitted by the plurality of heat exchanger units and prevent stratification of the heated air, at least one air mover positioned proximate to one of the plurality of heat exchanger units; and
   a return manifold configured to receive the water-glycol fluid mixture as a plurality of return fluid streams from the plurality of heat exchanger units, the return manifold configured to merge the plurality of return fluid streams into a single return fluid stream and return the single return fluid stream to the burner for recirculation, and
   wherein a temperature difference between the water-glycol fluid mixture received by the plurality of heat exchanger units and the ambient air within the affected area results in the affected area being raised to a target temperature greater than 122 degrees Fahrenheit.

* * * * *